United States Patent
Moore et al.

(10) Patent No.: US 9,651,458 B2
(45) Date of Patent: May 16, 2017

(54) METHOD AND SYSTEM FOR AUTO SAFETY VERIFICATION OF AGV SENSORS

(71) Applicant: Swisslog Logistics Inc., Newport News, VA (US)

(72) Inventors: Brad Moore, Newport News, VA (US); Horace Bailey, Newport News, VA (US); Isaiah Reynolds, Newport News, VA (US); Arsenio Evans, Newport News, VA (US)

(73) Assignee: Swisslog Logistics Inc., Newport News, VA (US)

( * ) Notice: Subject to any disclaimer, the term of this patent is extended or adjusted under 35 U.S.C. 154(b) by 0 days.

(21) Appl. No.: 14/856,902

(22) Filed: Sep. 17, 2015

(65) Prior Publication Data

US 2016/0084737 A1    Mar. 24, 2016

Related U.S. Application Data

(60) Provisional application No. 62/052,514, filed on Sep. 19, 2014.

(51) Int. Cl.
| | | |
|---|---|---|
| *G01M 17/007* | (2006.01) | |
| *G01S 17/93* | (2006.01) | |
| *G01S 7/497* | (2006.01) | |
| *G05D 1/00* | (2006.01) | |

(52) U.S. Cl.
CPC ......... *G01M 17/007* (2013.01); *G01S 7/4972* (2013.01); *G01S 17/936* (2013.01)

(58) Field of Classification Search
None
See application file for complete search history.

(56) References Cited

U.S. PATENT DOCUMENTS

| | | | | |
|---|---|---|---|---|
| 4,962,453 A | * | 10/1990 | Pong, Jr. | ............. A47L 11/4011 |
| | | | | 180/167 |
| 5,091,855 A | * | 2/1992 | Umehara | ......... G05B 19/41895 |
| | | | | 180/168 |
| 5,111,401 A | | 5/1992 | Everett, Jr. | |
| 5,191,528 A | * | 3/1993 | Yardley | ............... G05D 1/0261 |
| | | | | 180/168 |

(Continued)

FOREIGN PATENT DOCUMENTS

| | | |
|---|---|---|
| CN | 101776523 | 1/2012 |
| DE | 102010049687 | 5/2011 |

(Continued)

OTHER PUBLICATIONS

Dhake, Pravin, "A Real Time Operating System Based Test-Bed for Autonomous Vehicle Navigation", University of Missouri-Rolla, 2007, pp. 1-97.

(Continued)

*Primary Examiner* — Krishnan Ramesh
(74) *Attorney, Agent, or Firm* — Hunton & Williams LLP

(57) ABSTRACT

A method and system for auto safety verification of automatic guided vehicle (AGV) sensors is presented. An auto safety verification test can be performed autonomously by the AGV to ensure that sensors on the AGV are configured correctly and working properly. The auto safety verification test avoids human errors that exist in manual verification tests and significantly reduces the amount of time required to verify sensors on the AGV.

20 Claims, 6 Drawing Sheets

(56) References Cited

U.S. PATENT DOCUMENTS

| | | | |
|---|---|---|---|
| 5,216,605 A * | 6/1993 | Yardley | G05D 1/0261 180/168 |
| 5,545,967 A * | 8/1996 | Osborne | B60S 5/06 104/34 |
| 6,009,357 A * | 12/1999 | Wellman | G05B 9/02 180/168 |
| 6,594,560 B2 | 7/2003 | Lee | |
| 6,721,638 B2 | 4/2004 | Zeitler | |
| 7,612,575 B2 | 11/2009 | Ito et al. | |
| 7,743,660 B2 | 6/2010 | Marsh et al. | |
| 7,813,888 B2 | 10/2010 | Vian et al. | |
| 8,192,137 B2 | 6/2012 | Ross et al. | |
| 8,571,741 B2 | 10/2013 | El Fassi et al. | |
| 2003/0133362 A1 * | 7/2003 | Fortuna | G01S 7/523 367/100 |
| 2003/0163228 A1 * | 8/2003 | Pillar | A62C 27/00 701/1 |
| 2007/0179690 A1 * | 8/2007 | Stewart | G01C 21/00 701/23 |
| 2008/0109126 A1 * | 5/2008 | Sandin | G05D 1/028 701/23 |
| 2009/0128139 A1 * | 5/2009 | Drenth | G01R 33/02 324/207.22 |
| 2012/0011668 A1 * | 1/2012 | Schnittman | A47L 11/34 15/49.1 |
| 2012/0030474 A1 * | 2/2012 | Sayler | G06F 21/32 713/186 |
| 2012/0197477 A1 * | 8/2012 | Colwell | G05D 1/0212 701/25 |
| 2014/0067184 A1 * | 3/2014 | Murphy | G05D 1/0265 701/23 |
| 2014/0244097 A1 * | 8/2014 | Colwell | G05D 1/0212 701/25 |
| 2015/0032252 A1 * | 1/2015 | Galluzzo | B25J 5/007 700/218 |

FOREIGN PATENT DOCUMENTS

| | | |
|---|---|---|
| DE | 102011119356 | 5/2013 |
| DE | 102012007576 | 10/2013 |
| EP | 1980871 | 6/2009 |

OTHER PUBLICATIONS

AGV control Systems, May 13, 2012; Slide presentation published at http://www.slideserve.com/efia/agv-control-systems.

RoboteQ, "Building a Magnetic Track Guided AGV", 2014, http://www.roboteq.com/index.php/applications/how-to/278-building, pp. 1-8.

Khwang et al., "Development of a Test-Bed for Outdoor AGV Research", The EEE Journal of NTU, 2001, pp. 1-3.

Berman et al., "Evaluation of Automatic Guided Vehicle Systems", Robotics and Computer-Integrated Manufacturing, 2008, pp. 1-7.

"Experimental Systems and Test-Bed Development", http://www.iau.dtu.dk/research/autonom/testbeds.html, 2014, pp. 1-3.

Kim et al., "Positioning and Driving Control of Fork-type Automatic Guided Vehicle with Laser Navigation", International Journal of Fuzzy Logic and Intelligent Systems, vol. 13, No. 4, Dec. 2013, pp. 307-314.

Elkaim et al., "The Overbot: An Off-Road Autonomous Ground Vehicle Testbed", ION Global Navigation Satellite Systems Conference (ION-GNSS 2006), pp. 22-24, Sep. 26, 2006.

On-Line Training Program, Module 4a, "How Do the Vehicles Work in an AGV System?", AGVS Production Section of MHI, 2012, pp. 1-31.

\* cited by examiner

METHOD AND SYSTEM FOR AUTO SAFETY VERIFICATION OF AGV SENSORS

RELATED APPLICATION

This application claims priority to U.S. Provisional Patent Application 62/052,514 filed Sep. 19, 2014.

BACKGROUND

Automatic Guided Vehicles (AGVs) are often used in the material handling industry to haul various goods. An AGV operating in a warehouse, for example, is often presented with people or objects in the path of the vehicle, thereby requiring a safety stop of the vehicle prior to contact between the vehicle and the people or objects. Some conventional AGVs have noncontact sensing devices to sense people or objects in the vehicle's path, and thereby trigger stopping of the vehicle. These noncontact sensing devices must be fail-safe in their operation and are typically required to satisfy certain safety standards. One common safety standard that noncontact sensing devices on AGVs typically must satisfy is ANSI/ITSDF B56.5-2005 (hereinafter "ANSI B56.5"). Typically, a manual safety verification process is performed on each AGV to ensure that the AGV complies with one or more safety standards, or to ensure that sensors on the AGV are working properly, before the AGV is put into (or back into) service. A manual safety verification process is performed by a human and can take as long as thirty minutes for each AGV and is subject to human error or neglect. The present invention overcomes many problems inherent in manual safety verification processes.

DETAILED DESCRIPTION

Figure 1:
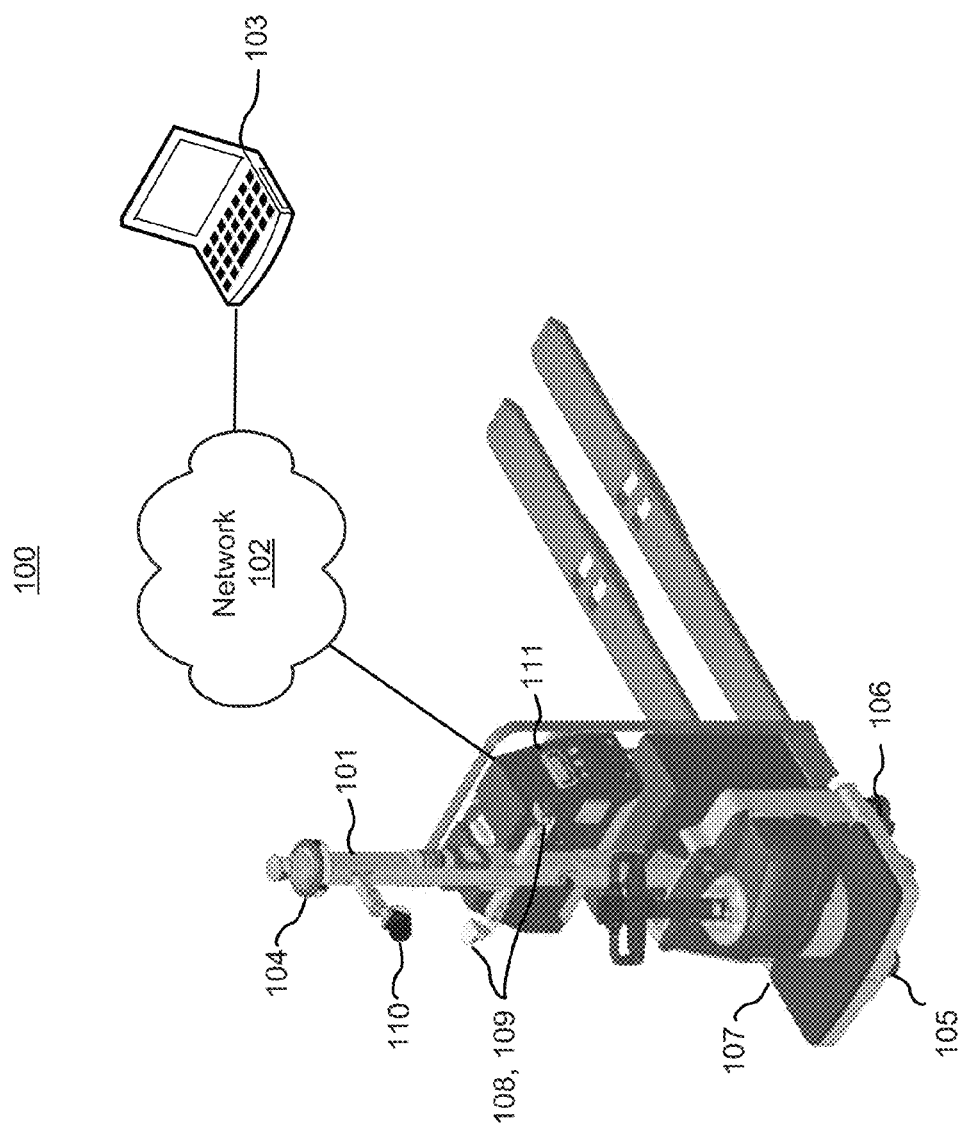
FIG. 1 depicts an exemplary AGV communicating with a computer via a network; according to an exemplary embodiment.

Reference will be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

The present invention is directed to an auto safety verification process for sensors on an AGV. The safety verification process may be to ensure that the AGV—or more particularly, sensors on the AGV—complies with one or more safety standards. Alternatively, the safety verification process may be to ensure that sensors on the AGV are configured correctly and working properly. An exemplary AGV has sensors that continually monitor fields or a perimeter around the AGV. The sensors alert the AGV's computer system if an object or person enters the field(s) around the AGV monitored by the sensors, thereby allowing the AGV to slow down and/or stop before colliding with the object. The sensors may monitor multiple fields around the AGV, and for explanatory purposes the present disclosure will refer to a warning field and a protective field. An object located by the AGV sensor(s) in the "warning field" may cause the AGV to slow down, while an object located by the AGV sensor(s) in the "protective field" may cause the AGV to come to a stop. The purpose of a safety verification test may be to verify that the warning fields and protective fields of the sensors on the AGV are correct and working properly.

The auto safety verification process according to exemplary embodiments of the present invention may pertain to several types of AGVs. AGVs may differ in type of navigation system, control systems, steering control, power source, location of use, load capacity, speed limitations, or level of complexity, for example. Exemplary types of navigation systems include laser target navigation, wired navigation, guide tape, optical guidance navigation, inertial (or gyroscopic) navigation, or Cartesian navigation, for example. In laser target navigation systems, wireless navigation of the AGV is performed using retroreflective tape on walls, poles, or machines. A rotating turret comprising a laser transmitter and receiver is mounted on the AGV. The rotating turret rotates (e.g., 6 times per second) and continually transmits a laser and then receives the laser after reflection off of the various reflectors. The angle and distance to the various reflectors are calculated and recorded. A reflector map is stored in the AGV's memory such that a processor on the AGV can use the angle calculations along with the reflector map to determine the AGV's exact location (e.g., to within 1-50 mm). In this manner the AGV can navigate to a designated location using a constantly updated position. Moreover, the AGV's path can be changed quickly and easily by reprogramming the AGV rather than needing to move physical objects such as tape or reflectors. Reference will be made to a laser navigation system in the exemplary embodiments, but it should be appreciated that the present invention may be used with other types of AGV navigation systems. Accordingly, a brief explanation of other types of navigation systems is included here.

In a wired navigation system, a wire is placed in the ground (e.g., in a slot one inch below ground) and a radio frequency is transmitted through the wire. A sensor on the AGV detects the radio frequency emanating from the wire and follows the frequency in order to move in the path of the wire. Although an embedded wire may not be easily damaged, the AGV path cannot be easily modified.

In guide tape navigation, magnetic or colored tape is laid on the floor in a desired path. A sensor on the AGV is configured to sense the tape and cause the AGV to follow the tape's path. Variations in the tape (e.g., color or degrees of magnetism) can also cause the AGV to speed up, slow down, or stop.

In optical guidance navigation, an ultraviolet painted stripe may be painted on the floor. A sensor on the AGV may illuminate the stripe with ultraviolet light, detect the stripe's presence, and thereby follow the stripe's path.

Inertial (or gyroscopic) navigation systems use accelerometers and gyroscopes on the AGV to measure the angular velocity of the AGV in an inertial reference frame. By using the original (known) orientation of the AGV in the inertial reference frame as the initial condition and integrating the angular velocity, the AGV's current orientation can be known at all times. However, inertial navigation systems suffer from integration drift (or the accumulation of small errors in the measurement of acceleration and angular velocity). Because the AGV's new position is calculated from the previous calculated position and from the measured acceleration and angular velocity, small measurement errors accumulate roughly proportionally to the time since the initial position was input.

In Cartesian navigation, an optical, barcode, or magnetic grid pattern covers the relevant area. Sensors on the AGV detect the gridlines or sequentially placed markers such that the AGV can calculate its present location using a map of the grid pattern stored in the AGV's memory.

AGVs may also differ in terms of steering control. In differential speed control, for example, the different wheels on the AGV can move at different speeds or in different directions, thereby allowing the AGV to maneuver in small spaces. Steered wheel control, on the other hand, is similar to conventional automobile steering where the wheels turn in the same direction and at the same rate. Either differential speed control or steered wheel control may be used in conjunction with embodiments of the present invention.

AGVs are typically powered by batteries, and AGVs in the exemplary embodiments are also powered by batteries. However, it should be appreciated that other power sources may be used, including, but not limited to, natural gas, gasoline or diesel engines, for example.

AGVs may be used in a variety of locations, including warehouses, production facilities, factories, hospitals, office buildings, indoors, outdoors, (un-)loading facilities, cargo ships, or roadways, for example. For purposes of the present invention, an auto safety verification process can be performed in any of these exemplary locations.

AGVs may also differ in load capacity. Exemplary AGVs may carry a load up to 6,000 lbs, up to 10,000 lbs, or up to 12,000 lbs, for example, but the present invention is not limited to a particular AGV load capacity. AGVs may also differ in speed limitations. Exemplary AGVs may have a maximum travel speed of 1500 mm/s, but the present invention is not limited to a particular speed limitation.

Finally, AGVs may differ in level of complexity. Exemplary AGVs may or may not have a central controller, automatic vehicle dispatch, product tracking, multiple path options, a host interface, an ethernet or WiFi link, or multiple transfer heights, for example. The auto safety verification process can be performed on relatively simple or complex AGVs.

Additionally, various types of sensors may be used on an AGV for safety purposes and object detection, including laser sensors and ultrasonic sensors, for example. For purposes of this explanation, reference will be made to laser sensors, such as laser scanners manufactured by SICK, Inc. An exemplary AGV may have one or more laser scanners that are used for safety and/or object detection/avoidance. For purposes of this disclosure, "safety" laser scanners may be said to scan the ground in a direction of travel of the AGV, while "object" scanners may be said to scan an area above the ground, such as 8" above ground and higher. In this manner, the ground surface in front of the AGV and the area above the ground around the AGV may be continually monitored by one or more sensors on the AGV to detect objects (including people) that may happen to come into one of these monitored areas. As mentioned above, these monitored areas may be classified as "warning" or "protective" areas or fields, for example.

Again, the purpose of a safety verification test may be to verify that the warning fields and protective fields of the sensors on the AGV are correct and working properly. For the sensors to be "correct" implies that the sensor configurations are properly loaded into the AGV. For example, a correct sensor configuration may specify that a warning field is to extend between five feet and fourteen feet in front of the AGV moving at a particular speed (e.g., maximum speed), and a protective field is to extend from an end of the AGV up to five feet in front of the AGV moving at a particular speed (e.g., maximum speed). Even if a sensor is calibrated correctly such that the sensor properly detects an object at a specified range within a given tolerance value (e.g., properly sensing an object at 14' 1" when the sensor is configured to sense objects at 14' and the sensor has a tolerance value of 2"), if the sensor configuration is improperly loaded into the AGV's computer system (e.g., the loaded configuration specifies that the sensor is to detect objects within 6" of the AGV instead of 14'), then serious safety hazards may result. Accordingly, a safety verification test is performed in addition to calibration testing, and the purpose of a safety verification test is to verify that the warning fields and protective fields of the sensors on the AGV are correct and working properly.

As referred to above, a conventional manual safety verification test is performed by a human and can take upwards of thirty minutes per AGV tested. In a conventional manual safety verification test, the AGV does not move, but a human moves objects toward the AGV until a sensor on the AGV is activated, and then the human measures the distance from the AGV to the point at which the object activated the sensor. If this measured distance is within predetermined field parameters, then it may be determined that the sensor is programmed correctly and working properly. However, in a conventional manual safety verification test, a human is required to move the objects, measure distances, and verify parameters. Moreover, in a conventional manual safety verification test, one cannot measure a final stopping position of the AGV because the AGV does not move during the test, nor can the sensors be verified accurately at different speeds of the AGV because, again, the AGV does not move during the test and a human is moving objects toward the AGV. Accordingly, other systems of the AGV are not implicated in a conventional safety verification test (e.g., the braking system), nor can one assure that certain sensors or sensor field configurations are activated at different speeds of the AGV.

In exemplary embodiments of the auto safety verification test, on the other hand, the test can be completed in approximately six minutes per AGV and very little human input is required. In an exemplary embodiment, the AGV moves during the test and the sensors can be verified accurately at different speeds of the AGV. Moreover, other AGV systems (e.g., the braking system) are implicated in the test in the exemplary embodiment because the AGV is moving and the AGV itself can measure the final stopping position of the AGV or locations where the AGV changed speeds, and compare such positions/locations to a starting location, or the location of the AGV when the test began. The auto safety verification test also effectively overcomes human error and/or human neglect.

The description below of the exemplary auto safety verification process describes modules that may include one or more servers, databases, subsystems and other components. As used herein, the term "module" may be understood to refer to non-transitory executable software, firmware, processor, hardware, and/or various combinations thereof. Modules, however, are not to be interpreted as software that is not implemented on hardware, firmware, or recorded on a tangible processor-readable or recordable storage medium (i.e., modules are not software per se). The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Referring to FIG. 1, a schematic diagram of a system 100 for enabling auto safety verification is shown, according to an exemplary embodiment. As illustrated, AGV 101 may be communicatively coupled with network device 103 via network 102. AGV 101 may comprise a navigation sensor 104, a front bumper sensor 105, a left bumper sensor 106, a right bumper sensor 107 (not shown), object detection sensors 108, 109 (e.g., TiMS lasers), and a safety scanner 110 (e.g., a laser safety scanner such as SICK S300). Each of these exemplary sensors/scanners may be referred to as a safety sensor, or they may be referred to collectively as safety sensors. Each of the safety sensors is not required; however, the AGV preferably has at least a front bumper sensor 105. Front bumper sensor 105 views an area in front of the AGV in the direction of travel. Another sensor that performs the same function may be considered a "front bumper sensor" in embodiments of the present invention. The safety sensors may communicate with an onboard control module 111, which is shown in block diagram in FIG. 2. The safety sensors may have a 270 degree field of view and a range of 3 meters, for example.

Network 102 may be a wireless network, a wired network or any combination of wireless network and wired network. For example, network 102 may include one or more of a Wi-Fi, IEEE 802.11a, 802.11b, 802.15.1, 802.11g, 802.11n, 802.11ac, an Internet network, a wireless LAN, a Personal Area Network ("PAN"), a mesh network, or any other wired or wireless network for transmitting or receiving a data signal. Also, network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, the Internet or one or more of a service provider network, a cellular network, an enterprise network, corporate network, or home network, for example.

Network client 103 may be a desktop computer, a laptop computer, a tablet, a server, a smartphone, or other computer capable of sending or receiving network signals. Network client 103 may use a wired or wireless connection. It should also be appreciated that the network client 103 may be a portable electronic device capable of being transported. Network client 103 may store various configuration files. A configuration file may comprise the safety field configurations for the sensor(s) on the AGV. For example, the configuration file may specify the size (e.g., length, width, and/or height) of the warning field and/or protective field, which size may be dependent on speed of the AGV. The configuration file may also specify what is to happen when an object is sensed within the warning and/or protective field. An exemplary configuration file may specify that a warning field is to extend between five feet and fourteen feet in front of the AGV moving at maximum speed (e.g., 1500 mm/s), that a protective field is to extend from an end of the AGV up to five feet in front of the AGV moving at a maximum speed (e.g., 1500 mm/s), that the AGV is to slow down to a predetermined speed upon sensing an object in the warning field, and that the AGV is to stop upon sensing an object in the protective field (by applying brakes or coasting to a stop, for example). A configuration file may specify that a protective field is to envelop the AGV on all sides with a 6" field. Whatever the precise parameters of the configuration file are, a processing module 204 on the AGV will process the configuration file and control the AGV accordingly. For example, if the configuration file specifies a protective field of 6" around the AGV, and one or more sensors on the AGV sense an object within this field, then the AGV will immediately stop by applying brakes on the AGV. Similarly, if a configuration file specifies a warning field extending fourteen feet in front of the AGV, and one or more sensors on the AGV sense an object within this field, then the AGV will slow down to a predetermined speed. Different fields (e.g., both warning and protective fields) may be programmed into one sensor such that a single sensor may have both warning field parameters and protective field parameters.

It should be appreciated that each of the communications devices, servers, modules, or network elements may include one or more processors. One or more data storage systems (e.g., databases) may also be coupled to each of the devices or servers of the system. It should also be appreciated that software may be implemented in one or more computer processors, modules, network components, or devices.

System 100 of FIG. 1 may be implemented in a variety of ways. Architecture within system 100 may be implemented as a hardware component (e.g., as a module) within a network element. It should also be appreciated that architecture within system 100 may be implemented in computer executable software (e.g., on a tangible, non-transitory computer-readable medium). Module functionality of the architecture within system 100 may be located on a single device or distributed across a plurality of devices including one or more centralized servers or network devices.

Figure 2:
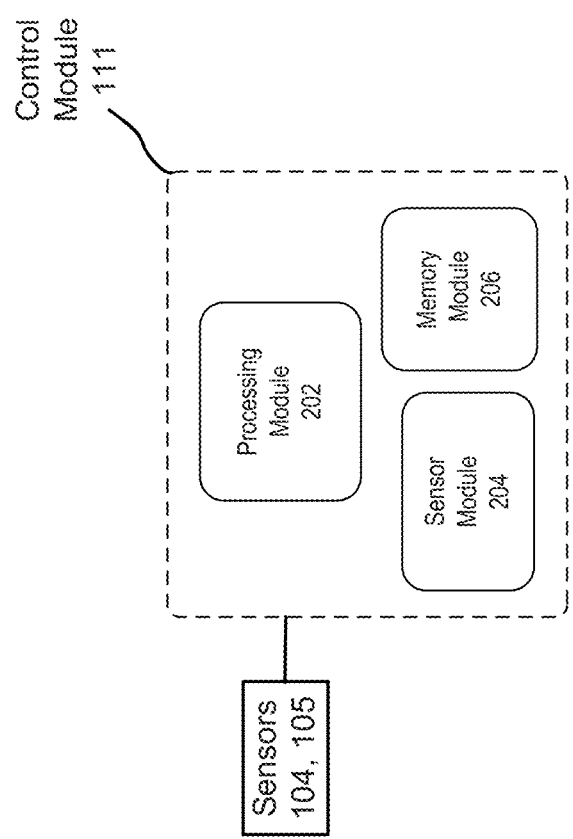
FIG. 2 depicts a block diagram of an exemplary control module on board the AGV, according to an exemplary embodiment of the invention.

Referring to FIG. 2, a diagram of an exemplary control module 111 is shown, according to an exemplary embodiment. Control module 111 may be onboard the AGV 101 and may comprise a number of modules for receiving configuration files (through either a wired or wireless connection), configuring sensors on the AGV 101, and controlling the AGV 101, for example. Control module 111 may comprise a processing module 202, a sensor module 204, and a memory module 208, for example. Each of these modules may be communicatively coupled (through either a wired or wireless connection) with other modules, sensors on the AGV 101, network client 103, or other data communicating devices either on or off the AGV 101. Each of these exemplary modules will be explained in further detail below.

Processing module 202 may be responsible for processing data input from sensors on the AGV 101, comparing sensor input data to parameters and/or configuration files stored in memory module 106, updating parameters and/or configuration files stored in memory module 106, communicating with network client 103, navigating and driving AGV 101, and running the auto safety verification test. Processing module 202 may receive configuration files from network client 103 and store the configuration files in memory module 206. Such a process may be termed "loading" or "downloading" a configuration file onto AGV 101. Upon loading a new configuration file onto AGV 101, or upon deletion of an old configuration file stored in memory module 206 of AGV 101, processing module 202 may require that the AGV undergo an auto safety verification test. Processing module 202 may be responsible for carrying out the auto safety verification test, recording results in memory module 206, and outputting a report of the test results to network client 103, for example.

Figure 3:
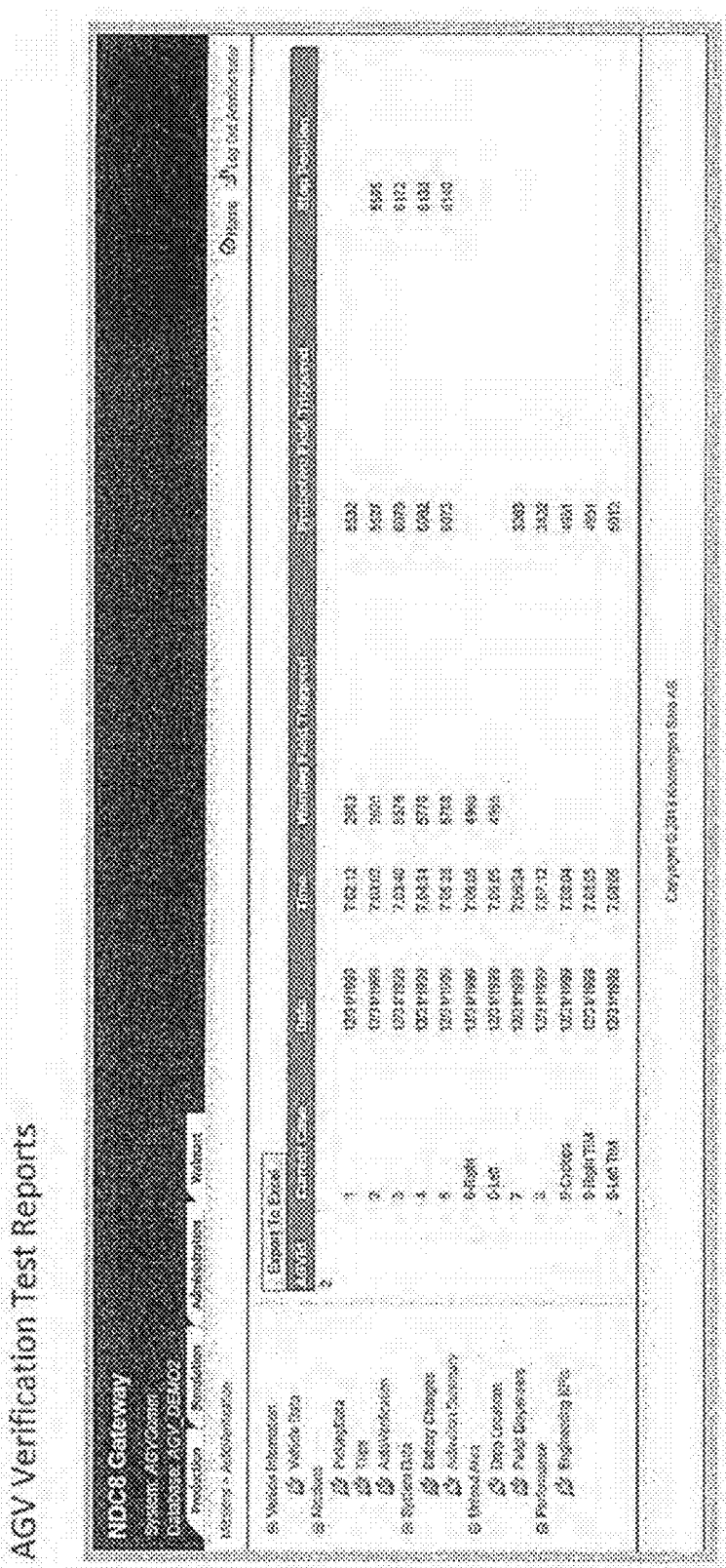
FIG. 3 depicts an exemplary screenshot of an auto verification test report, according to an exemplary embodiment of the invention.

Reports of the test may be auto-generated by processing module 202 as the tests are run. An exemplary report of a test is shown in FIG. 3. Exemplary reports may contain the AGVId, "Current Case," date, time, warning field triggered distance, protective field triggered distance, and/or stop position. The last three columns (warning field triggered, protective field triggered, and stop position) may be in any units, but are shown in millimeters in FIG. 3. The AGVId comprises an identification of the AGV being tested. "Current Case" may pertain to a particular test case. A very thorough auto safety verification test may perform multiple test cases, such as ten test cases for example, although only one test case may be required to satisfy various safety standards, such as ANSI B56.5. Particular test cases may pertain to one or more particular sensors on AGV 101 or particular movements of AGV 101, for example. Exemplary test cases are explained further below with reference to FIG. 4. The exemplary test report shown in FIG. 3 includes nine test cases. Test cases 6 and 9 tested several sensors simultaneously so the particular sensor that was tested is also listed under the "Current Case" column of the report. The date and time columns pertain to the date and time at which the particular test on the AGV was run. The "warning field triggered" column may specify the distance from the start point to the location at which the AGV's warning field was triggered. Exemplary test case 6 only tested the warning field sensors. The "protective field triggered" column may specify the distance from the start point to the location at which the AGV's protective field was triggered. Exemplary test cases 7-9 only tested the protective field sensors. The "stop position" column may specify the final position of the AGV 101 along the traveling segment. From this data one may determine how far the AGV travelled from the starting position and how long the AGV took to stop once the protective field was triggered. Additional data may be included in the report, such as sensor field configurations, AGV speed parameters at different points during the test, and particular parameters for each of the test cases performed, for example.

Sensor module 204 may be responsible for receiving data from sensors on the AGV 101 and outputting sensor configuration data to the sensors on the AGV, as read from sensor configuration files stored in memory module 206, for example. Sensor module 204 may relay sensor data to processing module 202 and may also relay sensor configuration data from the processing module 202 or memory module 206 to the sensors on the AGV 101.

Memory module 206 may be responsible for storing past and current sensor input data, location data with respect to AGV 101, map data with respect to the environment in which AGV 101 is located, and sensor configuration data. Map data and AGV location data may both be represented by coordinates, such as X, Y, and/or Z coordinates, for example. Map data may comprise navigational object data and physical constraint data, including locations of navigational objects and physical constraints. In a laser target navigation system, the navigational objects may be retroreflective tape on walls, poles, or machines and a map of the location of such items may be referred to as a reflector map. Physical constraint data may include information on the location of walls (exterior or interior), immovable or movable objects that may present an obstacle to the AGV 101 (such as shelves, doors, door stops, equipment, furniture, or other AGVs, for example). Memory module 206 may be updated via processing module 202 and or via network client 103.

Figure 4:
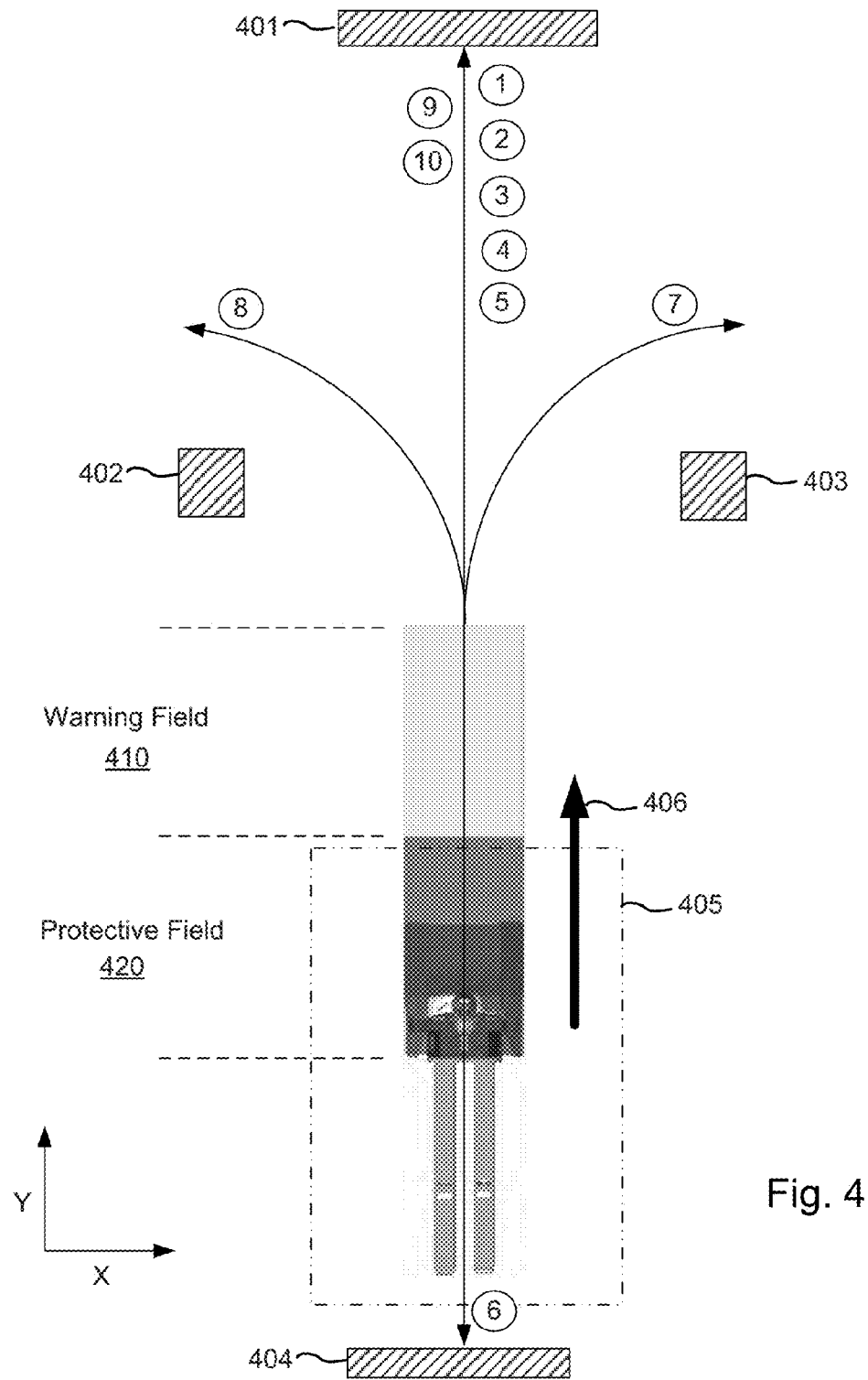
FIG. 4 depicts exemplary test cases for the auto safety verification of AGV sensors, according to exemplary embodiments of the invention.

With reference to FIG. 4, exemplary test cases will now be explained. The various exemplary test cases are designated by an encapsulated numeral—1 thru 10 in FIG. 4. Each of test cases 1 thru 10 are not required. Only one test case may be required to satisfy a particular safety standard or to verify particular sensor fields for one or more sensors. Moreover, the exemplary test cases are not intended to be limiting in nature, but are provided by way of example and may be modified to test different parameters, sensors, and/or fields, for example. The location and shape of exemplary test objects 401-404 are provided by way of example. Their location and shape may be modified without impacting the manner in which the exemplary test cases are carried out. The exemplary location of test objects 401-404 are provided to test various movements of AGV 101, including forward, rightward, leftward, and backward movement. Test objects 401-404 may be of any material that can be sensed by a laser sensor, for example. Preferably, test objects 401-404 extend from off the floor (e.g., 8"). Exemplary test objects 401-404 are made of lightweight material to enable easy handling, and may comprise lightweight blocks or PVC pipe, for example. Test objects 401-404 are preferably portable, but may be permanently stationed in their respective locations. In carrying out the exemplary test cases, the location of test objects 401-404 is known and recorded such that the AGV's location may be known relative to test objects 401-404. Markers (such as tape) may indicate locations on the floor where test objects 401-404 should be placed prior to the test. An exemplary test area that encapsulates test objects 401-404 may be 15'×40', for example.

In exemplary test case 1, the warning field and protective field of the bottom front bumper sensor 105 may be tested. To run the auto safety verification test for test case 1, AGV 101 is navigated or placed into insert zone 405. Insert zone 405 may be a general area, and not an exact zone, near one or more of test objects 401-404. In the exemplary embodiment, a human operator may place AGV 101 in the insert zone 405, but AGV 101 may navigate itself into insert zone 405 in other embodiments. If a human operator places AGV 101 into insert zone 405, AGV 101 may adjust its position such that AGV 101 is within a predetermined distance range to one or more of test objects 401-404.

Once AGV 101 is in insert zone 405, processing module 202 records the AGV's starting location using navigation sensor 104. Hence, before the test begins, AGV 101 knows the AGV's starting position and the location of one or more test objects 401-404 that will be used in the particular test case. In exemplary test case 1, the AGV may drive forward between 1001 to 1500 mm/s towards forward test object 401. Additionally or alternatively, in exemplary test case 1, AGV 101 may drive forward at a maximum speed towards forward test object 401. Arrow 406 indicates a forward direction. As AGV 101 accelerates up to speed, the size of the warning field and protective field may be dynamically adjusted as the AGV's speed changes. In other words, in an exemplary embodiment, the higher the speed of AGV 101, the larger the size of the warning and protective fields, and vice versa.

As AGV 101 travels toward forward test object 401, the warning field on the bottom front bumper sensor 105 will eventually be triggered because the front bumper sensor 105 will detect an object (in this case, forward test object 401) in its warning field. Once the warning field is triggered, processing module 202 records the location of AGV 101 and begins to slow AGV 101 down to a predetermined, constant speed. Alternatively, as front bumper sensor 105 continues to detect the forward test object 401 in its warning field, processing module 202 may receive an indication of such data from sensor module 204 and may dynamically adjust the speed of AGV 101. For example, as AGV 101 continues to move closer to forward test object 401, processing module 202 may slow AGV 101 down even further, but will not stop AGV 101. In either case, AGV 101 continues to move closer to forward test object 401, and when front bumper sensor 105 detects forward test object 401 in its the protective field, processing module 202 records the location of AGV 101 and stops AGV 101 from moving further by applying brakes on the AGV or allowing the AGV 101 to quickly coast to a stop, for example. The final stop position of AGV 101 may or may not be recorded. Once the locations are recorded where the warning and protective fields are triggered, processing module 202 may analyze the results to determine whether AGV 101 passed the particular test case.

With respect to the warning field triggered location, processing module 202 may compare this location to the known location of forward test object 401 and determine a distance therebetween. This distance may be termed the warning field test length for test case 1 (or "$WFTL_1$"). If we assume that AGV 101 had coordinates of (0, 0) at its starting position, and coordinates (0, $Y_{1W}$) when the warning field was triggered, and that the forward test object 401 has coordinates (0, $Y_{For}$), then simply the Y-coordinates may be analyzed by processing module 202. Accordingly, the distance from AGV 101 to forward test object 401 when the warning field was triggered may be represented as $|Y_{1W}-Y_{For}|=WFTL_1$. Processing module 202 may then compare the Warning Field Test Length 1 to the warning field size recorded in memory module 206. For example, the sensor configuration file for the front bumper sensor 105 may specify a warning field length (or $WFL_1$) of fourteen feet in front of AGV 101 when AGV 101 is moving at maximum speed. The front bumper sensor 105 sensor configuration may also specify a tolerance value (e.g., 6"). In the present example, the calculated Warning Field Test Length 1 may be 13' 8", which falls in the exemplary tolerance range of 13' 6" to 14' 6". Accordingly, front bumper sensor 105 may be said to have passed the warning field test for test case 1. If the warning field test length did not fall in the allowable tolerance range, then front bumper sensor 105 may be said to have failed the warning field test for test case 1. If a test results in failure, the tested sensor(s) may be mis-aligned (e.g., angled improperly), one or more of the sensor(s) may be calibrated incorrectly (e.g., the tested sensor(s) or the navigational sensor), or the tested sensor(s) configurations may be improper. Therefore, if a test case fails, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

With respect to the protective field triggered location, processing module 202 may compare this location to the known location of forward test object 401 and determine a distance therebetween. This distance may be termed the protective field test length for test case 1 (or "$PFTL_1$"). Assuming again that AGV 101 had coordinates of (0, 0) at its starting position, and coordinates (0, $Y_{1P}$) when the protective field was triggered, and that the forward test object 401 has coordinates (0, $Y_{For}$), then the distance from AGV 101 to forward test object 401 when the protective field was triggered may be represented as $|Y_{1P}-Y_{For}|=PFTL_1$. Processing module 202 may then compare the Protective Field Test Length 1 to the protective field size recorded in memory module 206. For example, the sensor configuration file for the front bumper sensor 105 may specify a protective field length (or $PFL_1$) of five feet in front of AGV 101 when AGV 101 is moving at maximum speed. The front bumper sensor 105 sensor configuration may also specify a tolerance value (e.g., 4"). In the present example, the calculated Protective Field Test Length 1 may be 5' 1", which falls in the exemplary tolerance range of 5' 4" to 4' 8".

Accordingly, front bumper sensor 105 may be said to have passed the protective field test for test case 1. If the protective field test length did not fall in the allowable tolerance range, then front bumper sensor 105 may be said to have failed the protective field test for test case 1. As explained above, if a test results in failure, the tested sensor(s) may be mis-aligned (e.g., angled improperly), one or more of the sensor(s) may be calibrated incorrectly (e.g., the tested sensor(s) or the navigational sensor), or the tested sensor(s) configurations may be improper. Therefore, if a test case fails, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Depending on whether a particular test case passes or fails, control module 111 may output a "PASS" or "FAIL" data message in addition to any other relevant information on its display, and thereafter permit or prevent AGV 101 from operating in automatic mode outside of the auto safety verification test. If the warning field portion of test case 1 fails, control module 111 may output "Warning Distance FAIL," for example. In one embodiment, processing module 202 may prevent AGV 101 from being placed into an automatic mode until the one or more test cases pass. In this manner, AGV 101 may not drive autonomously (outside of a safety test, for example) until the warning fields and protective fields of the sensors on the AGV are verified to be correct and working properly.

Test case 1 may be all that is required to satisfy particular safety standards. However, other test cases may be performed to further verify other warning and protective fields of sensors on the AGV. For example, other sensors may be tested or other field parameters of the same sensor may be tested, particularly if different AGV speeds correspond to different field parameters.

Exemplary test case 2 may test the warning field and protective field of the bottom front bumper sensor 105 when AGV 101 is traveling at a speed less than a maximum speed. To run the auto safety verification test for test case 2, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 2 begins, AGV 101 knows the AGV's starting position and the location of forward test object 401. In exemplary test case 2, the AGV may drive forward between 751 to 1000 mm/s towards forward test object 401. As AGV 101 travels toward forward test object 401, the warning field on the bottom front bumper sensor 105 will eventually be triggered because the front bumper sensor 105 will detect an object (in this case, forward test object 401) in its warning field. Once the warning field is triggered, processing module 202 records the location of AGV 101 and begins to slow AGV 101 down to a predetermined, constant speed. Alternatively, as front bumper sensor 105 continues to detect the forward test object 401 in its warning field, processing module 202 may receive an indication of such data from sensor module 204 and may dynamically adjust the speed of AGV 101. For example, as AGV 101 continues to move closer to forward test object 401, processing module 202 may slow AGV 101 down even further, but will not stop AGV 101. In either case, AGV 101 continues to move closer to forward test object 401, and when front bumper sensor 105 detects forward test object 401 in its the protective field, processing module 202 records the location of AGV 101 and stops AGV 101 from moving further. The final stop position of AGV 101 may or may not be recorded. Once the locations are recorded where the warning and protective fields are triggered, processing module 202 may analyze the results to determine whether AGV 101 passed the particular test case.

With respect to the warning field triggered location, processing module 202 may compare this location to the known location of forward test object 401 and determine a distance therebetween. This distance may be termed the warning field test length for test case 2 ("$WFTL_2$"). Assuming again that AGV 101 had coordinates of (0, 0) at its starting position, and coordinates (0, $Y_{2W}$) when the warning field was triggered, and that the forward test object 401 has coordinates (0, $Y_{For}$), then the distance from AGV 101 to forward test object 401 when the warning field was triggered may be represented as $|Y_{2W}-Y_{For}|=WFTL_2$. Processing module 202 may then compare $WFTL_2$ to the warning field size recorded in memory module 206 for the particular speed at which AGV 101 was travelling. For example, the sensor configuration for the front bumper sensor 105 may specify a warning field length (or $WFL_2$) of ten feet, for example, in front of AGV 101 when AGV 101 is moving between 751 to 1000 mm/s. The front bumper sensor 105 sensor configuration may also specify a tolerance value (e.g., 6"). In the present example, the calculated $WFTL_2$ may be 9' 8", which falls in the exemplary tolerance range of 10' 6" to 9' 6". Accordingly, front bumper sensor 105 may be said to have passed the warning field test for test case 2. If the warning field test length did not fall in the allowable tolerance range, then front bumper sensor 105 may be said to have failed the warning field test for test case 2. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

With respect to the protective field triggered location, processing module 202 may compare this location to the known location of forward test object 401 and determine a distance therebetween. This distance may be termed the protective field test length for test length 2 (or "$PFTL_2$"). Assuming again that AGV 101 had coordinates of (0, 0) at its starting position, and coordinates (0, $Y_{2P}$) when the protective field was triggered, and that the forward test object 401 has coordinates (0, $Y_{For}$), then the distance from AGV 101 to forward test object 401 when the protective field was triggered may be represented as $|Y_{2P}-Y_{For}|=PFTL_2$. Processing module 202 may then compare $PFTL_2$ to the protective field size recorded in memory module 206 for the relevant speed. For example, the sensor configuration for the front bumper sensor 105 may specify a protective field length (or $PFL_2$) of four feet in front of AGV 101 when AGV 101 is moving at 751 to 1000 mm/s. The front bumper sensor 105 sensor configuration may also specify a tolerance value (e.g., 4"). In the present example, the calculated $PFTL_2$ may be 4' 1", which falls in the exemplary tolerance range of 4' 4" to 3' 8". Accordingly, front bumper sensor 105 may be said to have passed the protective field test for test case 2. If the protective field test length did not fall in the allowable tolerance range, then front bumper sensor 105 may be said to have failed the protective field test for test case 2. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 3 may test the warning field and protective field of the bottom front bumper sensor 105 when AGV 101 is traveling at a different speed than test cases 1 and 2. To run the auto safety verification test, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 3 begins, AGV 101 knows the AGV's starting position and the location of forward test object 401. In exemplary test case 3, the AGV may drive forward between 501 to 750 mm/s towards forward test object 401. As AGV 101 travels toward forward test object 401, the warning field on the bottom front bumper sensor 105 will eventually be triggered because the front bumper sensor 105 will detect an object (in this case, forward test object 401) in its warning field. Once the warning field is triggered, processing module 202 records the location of AGV 101 and begins to slow AGV 101 down to a predetermined, constant speed. Alternatively, as front bumper sensor 105 continues to detect the forward test object 401 in its warning field, processing module 202 may receive an indication of such data from sensor module 204 and may dynamically adjust the speed of AGV 101. For example, as AGV 101 continues to move closer to forward test object 401, processing module 202 may slow AGV 101 down even further, but will not stop AGV 101. In either case, AGV 101 continues to move closer to forward test object 401, and when front bumper sensor 105 detects forward test object 401 in its the protective field, processing module 202 records the location of AGV 101 and stops AGV 101 from moving further. The final stop position of AGV 101 may or may not be recorded. Once the locations are recorded where the warning and protective fields are triggered, processing module 202 may analyze the results to determine whether AGV 101 passed the particular test case.

With respect to the warning field triggered location, processing module 202 may compare this location to the known location of forward test object 401 and determine a distance therebetween. This distance may be termed the warning field test length for test case 3 ("$WFTL_3$"). Assuming again that AGV 101 had coordinates of (0, 0) at its starting position, and coordinates $(0, Y_{3W})$ when the warning field was triggered, and that the forward test object 401 has coordinates $(0, Y_{For})$, then the distance from AGV 101 to forward test object 401 when the warning field was triggered may be represented as $|Y_{3W}-Y_{For}|=WFTL_3$. Processing module 202 may then compare $WFTL_3$ to the warning field size recorded in memory module 206 for the particular speed at which AGV 101 was travelling. For example, the sensor configuration for the front bumper sensor 105 may specify a warning field length (or $WFL_3$) of eight feet, for example, in front of AGV 101 when AGV 101 is moving between 500 to 751 mm/s. The front bumper sensor 105 sensor configuration may also specify a tolerance value (e.g., 6"). In the present example, the calculated $WFTL_3$ may be 7' 8", which falls in the exemplary tolerance range of 8' 6" to 7' 6". Accordingly, front bumper sensor 105 may be said to have passed the warning field test for test case 3. If the warning field test length did not fall in the allowable tolerance range, then front bumper sensor 105 may be said to have failed the warning field test for test case 3. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

With respect to the protective field triggered location, processing module 202 may compare this location to the known location of forward test object 401 and determine a distance therebetween. This distance may be termed the protective field test length for test case 3 (or "$PFTL_3$"). Assuming again that AGV 101 had coordinates of (0, 0) at its starting position, and coordinates $(0, Y_{3P})$ when the protective field was triggered, and that the forward test object 401 has coordinates $(0, Y_{For})$, then the distance from AGV 101 to forward test object 401 when the protective field was triggered may be represented as $|Y_{3P}-Y_{For}|=PFTL_3$. Processing module 202 may then compare $PFTL_3$ to the protective field size recorded in memory module 206 for the relevant speed. For example, the sensor configuration for the front bumper sensor 105 may specify a protective field length (or $PFL_3$) of three feet, for example, in front of AGV 101 when AGV 101 is moving at 500 to 751 mm/s. The front bumper sensor 105 sensor configuration may also specify a tolerance value (e.g., 4"). In the present example, the calculated $PFTL_3$ may be 3' 1", which falls in the exemplary tolerance range of 3' 4" to 2' 8". Accordingly, front bumper sensor 105 may be said to have passed the protective field test for test case 3. If the protective field test length did not fall in the allowable tolerance range, then front bumper sensor 105 may be said to have failed the protective field test for test case 3. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 4 may test the warning field and protective field of the bottom front bumper sensor 105 when AGV 101 is traveling at a different speed than test cases 1-3. To run the auto safety verification test for test case 4, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 4 begins, AGV 101 knows the AGV's starting position and the location of forward test object 401. In exemplary test case 4, the AGV may drive forward between 301 to 500 mm/s towards forward test object 401. As AGV 101 travels toward forward test object 401, the warning field on the bottom front bumper sensor 105 will eventually be triggered because the front bumper sensor 105 will detect an object (in this case, forward test object 401) in its warning field. Once the warning field is triggered, processing module 202 records the location of AGV 101 and begins to slow AGV 101 down to a predetermined, constant speed. Alternatively, as front bumper sensor 105 continues to detect the forward test object 401 in its warning field, processing module 202 may receive an indication of such data from sensor module 204 and may dynamically adjust the speed of AGV 101. For example, as AGV 101 continues to move closer to forward test object 401, processing module 202 may slow AGV 101 down even further, but will not stop AGV 101. In either case, AGV 101 continues to move closer to forward test object 401, and when front bumper sensor 105 detects forward test object 401 in its the protective field, processing module 202 records the location of AGV 101 and stops AGV 101 from moving further. The final stop position of AGV 101 may or may not be recorded. Once the locations are recorded where the warning and protective fields are triggered, processing module 202 may analyze the results to determine whether AGV 101 passed the particular test case.

With respect to the warning field triggered location, processing module 202 may compare this location to the known location of forward test object 401 and determine a distance therebetween. This distance may be termed the warning field test length for test case 4 ("$WFTL_4$"). Assuming again that AGV 101 had coordinates of (0, 0) at its starting position, and coordinates $(0, Y_{4W})$ when the warning field was triggered, and that the forward test object 401 has coordinates $(0, Y_{For})$, then the distance from AGV 101 to forward test object 401 when the warning field was triggered may be represented as $|Y_{4W}-Y_{For}|=WFTL_4$. Processing module 202 may then compare $WFTL_4$ to the warning field size recorded in memory module 206 for the particular speed at which AGV 101 was travelling. For example, the sensor configuration for the front bumper sensor 105 may specify a warning field length (or $WFL_4$) of four feet, for example, in front of AGV 101 when AGV 101 is moving between 301 to 500 mm/s. The front bumper sensor 105 sensor configuration may also specify a tolerance value (e.g., 6"). In the present example, the calculated WFTL$_4$ may be 3' 8", which falls in the exemplary tolerance range of 4' 6" to 3' 6". Accordingly, front bumper sensor 105 may be said to have passed the warning field test for test case 4. If the warning field test length did not fall in the allowable tolerance range, then front bumper sensor 105 may be said to have failed the warning field test for test case 4. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

With respect to the protective field triggered location, processing module 202 may compare this location to the known location of forward test object 401 and determine a distance therebetween. This distance may be termed the protective field test length for test case 4 (or "PFTL$_4$"). Assuming again that AGV 101 had coordinates of (0, 0) at its starting position, and coordinates (0, Y$_{4P}$) when the protective field was triggered, and that the forward test object 401 has coordinates (0, Y$_{For}$), then the distance from AGV 101 to forward test object 401 when the protective field was triggered may be represented as |Y$_{4P}$−Y$_{For}$|=PFTL$_4$. Processing module 202 may then compare PFTL$_4$ to the protective field size recorded in memory module 206 for the relevant speed. For example, the sensor configuration for the front bumper sensor 105 may specify a protective field length (or PFL$_4$) of two feet, for example, in front of AGV 101 when AGV 101 is moving at 301 to 500 mm/s. The front bumper sensor 105 sensor configuration may also specify a tolerance value (e.g., 4"). In the present example, the calculated PFTL$_4$ may be 2' 1", which falls in the exemplary tolerance range of 2' 4" to 1' 8". Accordingly, front bumper sensor 105 may be said to have passed the protective field test for test case 4. If the protective field test length did not fall in the allowable tolerance range, then front bumper sensor 105 may be said to have failed the protective field test for test case 4. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 5 may test the warning field and protective field of the bottom front bumper sensor 105 when AGV 101 is traveling at a different speed than test cases 1-4. To run the auto safety verification test for test case 5, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 5 begins, AGV 101 knows the AGV's starting position and the location of forward test object 401. In exemplary test case 5, the AGV may drive forward between 1 to 300 mm/s towards forward test object 401. As AGV 101 travels toward forward test object 401, the warning field on the bottom front bumper sensor 105 will eventually be triggered because the front bumper sensor 105 will detect an object (in this case, forward test object 401) in its warning field. Once the warning field is triggered, processing module 202 records the location of AGV 101 and begins to slow AGV 101 down to a predetermined, constant speed. Alternatively, as front bumper sensor 105 continues to detect the forward test object 401 in its warning field, processing module 202 may receive an indication of such data from sensor module 204 and may dynamically adjust the speed of AGV 101. For example, as AGV 101 continues to move closer to forward test object 401, processing module 202 may slow AGV 101 down even further, but will not stop AGV 101. In either case, AGV 101 continues to move closer to forward test object 401, and when front bumper sensor 105 detects forward test object 401 in its the protective field, processing module 202 records the location of AGV 101 and stops AGV 101 from moving further. The final stop position of AGV 101 may or may not be recorded. Once the locations are recorded where the warning and protective fields are triggered, processing module 202 may analyze the results to determine whether AGV 101 passed the particular test case.

With respect to the warning field triggered location, processing module 202 may compare this location to the known location of forward test object 401 and determine a distance therebetween. This distance may be termed the warning field test length for test case 5 ("WFTL$_5$"). Assuming again that AGV 101 had coordinates of (0, 0) at its starting position, and coordinates (0, Y$_{5W}$) when the warning field was triggered, and that the forward test object 401 has coordinates (0, Y$_{For}$), then the distance from AGV 101 to forward test object 401 when the warning field was triggered may be represented as |Y$_{5W}$−Y$_{For}$|=WFTL$_5$. Processing module 202 may then compare WFTL$_5$ to the warning field size recorded in memory module 206 for the particular speed at which AGV 101 was travelling. For example, the sensor configuration for the front bumper sensor 105 may specify a warning field length (or WFL$_5$) of two feet, for example, in front of AGV 101 when AGV 101 is moving between 1 to 300 mm/s. The front bumper sensor 105 sensor configuration may also specify a tolerance value (e.g., 6"). In the present example, the calculated WFTL$_5$ may be 1' 8", which falls in the exemplary tolerance range of 2' 6" to 1' 6". Accordingly, front bumper sensor 105 may be said to have passed the warning field test for test case 5. If the warning field test length did not fall in the allowable tolerance range, then front bumper sensor 105 may be said to have failed the warning field test for test case 5. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

With respect to the protective field triggered location, processing module 202 may compare this location to the known location of forward test object 401 and determine a distance therebetween. This distance may be termed the protective field test length for test case 5 ("PFTL$_5$"). Assuming again that AGV 101 had coordinates of (0, 0) at its starting position, and coordinates (0, Y$_{5P}$) when the protective field was triggered, and that the forward test object 401 has coordinates (0, Y$_{For}$), then the distance from AGV 101 to forward test object 401 when the protective field was triggered may be represented as |Y$_{5P}$−Y$_{For}$|=PFTL$_5$. Processing module 202 may then compare PFTL$_5$ to the protective field size recorded in memory module 206 for the relevant speed. For example, the sensor configuration for the front bumper sensor 105 may specify a protective field length (PFL$_5$) of one foot, for example, in front of AGV 101 when AGV 101 is moving at 1 to 300 mm/s. The front bumper sensor 105 sensor configuration may also specify a tolerance value (e.g., 4"). In the present example, the calculated PT$_5$ may be 1' 1", which falls in the exemplary tolerance range of 1' 4" to 8". Accordingly, front bumper sensor 105 may be said to have passed the protective field test for test case 5. If the protective field test length did not fall in the allowable tolerance range, then front bumper sensor 105 may be said to have failed the protective field test for test case 5. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 6 may test the warning field of the bottom right and left side bumper sensors 106, 107 when AGV 101 is traveling in a reverse direction toward rear test object 404. Rear test object 404 may comprise a single test object or a plurality of objects, such as one on a right side of the AGV's forks and one on a left side of the AGV's forks. Exemplary test case 6 may be to verify that the rear test object 404 (or both rear test objects 404 in the event that there are two rear test objects 404) is seen by the bottom right and left side bumper sensors 106, 107 (respectively). To run the auto safety verification test for test case 6, AGV 101 is navigated or placed into insert zone 405. AGV 101 may adjust its position such that AGV 101 is within a proper distance range to rear test object 404. Once AGV 101 is in insert zone 405, processing module 202 records the AGV's starting location using navigation sensor 104. Hence, before test case 6 begins, AGV 101 knows the AGV's starting position and the location of rear test object 404. In exemplary test case 6, the AGV may drive in reverse toward rear test object 404. As AGV 101 travels toward rear test object 404, the warning field on the bottom right and left side bumper sensors 106, 107 will eventually be triggered because the bottom right and left side bumper sensors 106, 107 will detect an object (in this case, rear test object 404) in their respective warning field. Once the warning fields are triggered, processing module 202 records the location of AGV 101 (when each respective warning field is triggered) and then stops AGV 101 (when either one or both warning fields are triggered for the bottom right and left side bumper sensors 106, 107). The final stop position of AGV 101 may or may not be recorded. Once the locations are recorded where the warning fields are triggered, processing module 202 may analyze the results to determine whether AGV 101 passed the particular test case.

With respect to the warning field triggered locations, processing module 202 may compare these locations (which may be the same) to the known location of rear test object 404 and determine a distance therebetween. This distance may be termed the warning field test length for test case 6 (or "WFTL$_{6R}$" and "WFTL$_{6L}$" for both the bottom right and left side bumper sensors 106, 107). Assuming again that AGV 101 had coordinates of (0, 0) at its starting position, and coordinates (0, Y$_{6RW}$) and (0, Y$_{6LW}$) when the warning field was triggered for the bottom right and left side bumper sensors 106, 107, respectively, and that the rear test object 404 has coordinates (0, -Y$_{Rear}$), then the distance from AGV 101 to rear test object 404 when the warning fields were triggered may be represented as $|Y_{6RW} - Y_{Rear}| = WFTL_{6R}$ and $|Y_{6LW} - Y_{Rear}| = WFTL_{6L}$ for the right and left side bumper sensors 106, 107, respectively. Processing module 202 may then compare WFTL$_{6R}$ and WFTL$_{6L}$ to the warning field sizes recorded in memory module 206, which warning field sizes may be dependent on the particular speed at which AGV 101 was travelling during the test. For example, the sensor configurations for the bottom right and left bumper sensors 106, 107 may specify a warning field length (or WFL$_6$) of one foot, for example, beyond the AGV 101 (e.g., beyond the forks of AGV 101) for each sensor. The bottom right and left bumper sensors 106, 107 sensor configuration may also specify a tolerance value (e.g., 1"). If the calculated WFTL$_{6R}$ and WFTL$_{6L}$ fall in the exemplary tolerance range of 1' 1" to 0' 11", then the bottom right and left bumper sensors 106, 107 may be said to have passed the warning field test for test case 6. If the warning field test lengths did not fall in the allowable tolerance range, then bottom right and left bumper sensors 106, 107 may be said to have failed the warning field test for test case 6. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

In exemplary test case 6, protective fields of the bottom right and left bumper sensors 106, 107 are not tested. Accordingly, another test case may be performed without testing a protective field of the bottom right and left bumper sensors 106, 107 in exemplary test case 6. Alternatively, a protective field for either or both bottom right and left bumper sensors 106, 107 may be tested in conjunction with exemplary test case 6, or during a similar rearward travel test case.

Exemplary test case 7 may test the protective field of the bottom right side bumper sensor 106 when AGV 101 is traveling forward and turning right toward right test object 403. Exemplary test case 7 may be to verify that the right test object 403 is seen by the bottom right side bumper sensor 106. To run the auto safety verification test for test case 7, AGV 101 is navigated or placed into insert zone 405. AGV 101 may adjust its position such that AGV 101 is within a proper distance range to right test object 403. Once AGV 101 is in insert zone 405, processing module 202 records the AGV's starting location using navigation sensor 104. Hence, before test case 7 begins, AGV 101 knows the AGV's starting position and the location of right test object 403. In exemplary test case 7, the AGV may drive forward and then turn toward right test object 403.

As AGV 101 turns toward right test object 403, the protective field on the bottom right side bumper sensor 106 will eventually be triggered because the bottom right side bumper sensor 106 will (or should) eventually detect an object (in this case, right test object 403) in its protective field. Once the protective field is triggered, processing module 202 records the location of AGV 101 and then stops AGV 101. Once the location is recorded where the protective field is triggered, processing module 202 may analyze the results to determine whether AGV 101 passed the particular test case.

With respect to the protective field triggered location, processing module 202 may compare the AGV's stopped location to the known location of right test object 403 and determine a distance therebetween. This distance may be termed the protective field test length for test case 7 (or "PFTL$_7$"). Assuming again that AGV 101 had coordinates $(X_{7P}, Y_{7P})$ when the protective field was triggered, and that the right test object 403 has coordinates $(X_{Right}, Y_{Right})$, then the distance from AGV 101 to right test object 403 when the protective field was triggered may be calculated using the Pythagorean Theorem, which may be represented as $[(X_{7P}-X_{Right})^2=(Y_{7P}-Y_{Right})^2]^{1/2}=PFTL_7$. Processing module 202 may then compare $PFTL_7$ to the protective field size recorded in memory module 206 for the relevant speed. For example, the sensor configuration for the right bumper sensor 106 may specify a protective field length (or $PFL_7$) of one foot, for example, along the right side of AGV 101. The protective field length may vary according to speed or remain constant regardless of the AGV's speed. The right bumper sensor 106 sensor configuration may also specify a tolerance value (e.g., 4"). In the present example, the calculated $PFTL_7$ may be 1' 1", which falls in the exemplary tolerance range of 1' 4" to 8". Accordingly, right bumper sensor 106 may be said to have passed the protective field test for test case 7. If the protective field test length did not fall in the allowable tolerance range, then right bumper sensor 106 may be said to have failed the protective field test for test case 7. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 8 may test the protective field of the bottom left side bumper sensor 107 when AGV 101 is traveling forward and turning left toward left test object 402. Exemplary test case 8 may be to verify that the left test object 402 is seen by the bottom left side bumper sensor 107. To run the auto safety verification test for test case 8, AGV 101 is navigated or placed into insert zone 405. AGV 101 may adjust its position such that AGV 101 is within a proper distance range to left test object 402. Once AGV 101 is in insert zone 405, processing module 202 records the AGV's starting location using navigation sensor 104. Hence, before test case 8 begins, AGV 101 knows the AGV's starting position and the location of left test object 402. In exemplary test case 8, the AGV may drive forward and then turn toward left test object 402.

As AGV 101 turns toward left test object 402, the protective field on the bottom left side bumper sensor 107 will eventually be triggered because the bottom left side bumper sensor 107 will (or should) eventually detect an object (in this case, left test object 402) in its protective field. Once the protective field is triggered, processing module 202 records the location of AGV 101 and then stops AGV 101. Once the location is recorded where the protective field is triggered, processing module 202 may analyze the results to determine whether AGV 101 passed the particular test case.

With respect to the protective field triggered location, processing module 202 may compare the AGV's stopped location to the known location of left test object 402 and determine a distance therebetween. This distance may be termed the protective field test length for test case 8 (or "$PFTL_8$"). Assuming again that AGV 101 had coordinates $(X_{8P}, Y_{8P})$ when the protective field was triggered, and that the left test object 402 has coordinates $(X_{Left}, Y_{Left})$, then the distance from AGV 101 to left test object 403 when the protective field was triggered may be calculated using the Pythagorean Theorem, which may be represented as $[(X_{8P}-X_{Left})^2+(Y_{8P}-Y_{Left})^2]^{1/2}=PFTL_8$. Processing module 202 may then compare $PFTL_8$ to the protective field size recorded in memory module 206 for the relevant speed. For example, the sensor configuration for the left bumper sensor 107 may specify a protective field length (or $PFL_8$) of one foot, for example, along the left side of AGV 101. The protective field length may vary according to speed or remain constant regardless of the AGV's speed. The left bumper sensor 107 sensor configuration may also specify a tolerance value (e.g., 4"). In the present example, the calculated $PFTL_8$ may be 1' 4", which falls in the exemplary tolerance range of 1' 4" to 8". Accordingly, left bumper sensor 107 may be said to have passed the protective field test for test case 8. If the protective field test length did not fall in the allowable tolerance range, then right bumper sensor 107 may be said to have failed the protective field test for test case 8. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 9 may test the protective fields of the object detection sensors 108, 109 (e.g., TiMs sensors), and safety scanner 110. Object detection sensors 108, 109 will be referred to as TiMs sensors 108, 109, and safety scanner 110 will be referred to as "cyclops" sensor 110 because of its location. The protective field of these sensors may vary according to AGV speed, and test case 9 may be run at different AGV speeds, such as any speed within 1001-1500 mm/s, 751-1000 mm/s, 501-750 mm/s, 301-500 mm/s, or 1-300 mm/s, for example. For simplicity, further reference will not be made to a particular speed in test case 9. The protective field for each sensor may be termed the protective field length (or "$PFL_9$") and this protective field length may be the same or different for each of the TiMs sensors 108, 109, and cyclops sensor 110. Accordingly, for simplicity, reference will be made to $PFL_9$ rather than referring to a protective field length for each of the three sensors being tested in test case 9.

To run the auto safety verification test for test case 9, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 9 begins, AGV 101 knows the AGV's starting position and the location of forward test object 401. In exemplary test case 9, the AGV 101 may drive forward towards forward test object 401. As AGV 101 travels toward forward test object 401, the protective fields on TiMs sensors 108, 109, and cyclops sensor 110 will eventually be triggered because these sensors will detect an object (in this case, forward test object 401) in their warning field. Processing module 202 records the location of AGV 101 as each of the sensor's protective fields are triggered.

Assuming that AGV 101 had coordinates of (0, 0) at its starting position, and coordinates $(0, Y_{9P, 108})$, $(0, Y_{9P, 109})$, $(0, Y_{9P, 110})$ when the protective fields of TiMs sensors 108, 109, and cyclops sensor 110 was triggered, respectively. Further assuming that the forward test object 401 has coordinates $(0, Y_{For})$, then the distance from AGV 101 to forward test object 401 (i.e., the protective field test length or $PFTL_9$) when the protective field was triggered should be represented as $|Y_{9P, 108}-Y_{For}|=PFTL_{9, 108}$; $|Y_{9P, 109}-Y_{For}|=PFTL_{9, 109}$; and $|Y_{9P, 110}-Y_{For}|=PFTL_{9, 110}$. Processing module 202 may then compare $PFTL_{9, 108\ldots 109}$ to the protective field size(s) recorded in memory module 206 (for the relevant speed). As explained above, in this example the sensor configuration for TiMs sensors 108, 109, and cyclops sensor 110 may be the same, and may specify a protective field length (or $PFL_9$) of one foot, for example, in front of AGV 101 (at a particular speed, such as when AGV 101 is moving at 1 to 300 mm/s). Sensor configurations for these three sensors may also specify a tolerance value (e.g., 2"). In the present example, the calculated $PFTL_{9, 108\ldots 109}$ may be 1' 1" for each of the three sensors, which falls in the exemplary tolerance range of 1' 2" to 10". Accordingly, TiMs sensors 108, 109, and cyclops sensor 110 may be said to have passed the protective field test for test case 9. If the protective field test length did not fall in the allowable tolerance range, then front bumper sensor 105 may be said to have failed the protective field test for test case 9. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Exemplary test case 10 may test an "extended" protective field of each of the TiMs sensors 108, 109. An "extended" protective field may be similar to a "protective field" for purposes of stopping AGV 101, for example, but may be different in size. For example, an "extended" protective field of the TiMs sensors 108, 109, according to exemplary sensor configurations, may have a size of three feet, rather than a size of one foot for the "protective field" of TiMs sensors 108, 109, mentioned above. The extended protective field length/size configuration (or EPFL) may be the same for each of the TiMs sensors 108, 109. However, the extended protective fields of TiMs sensors 108, 109 may vary according to AGV speed, and test case 10 may be run at different AGV speeds, such as any speed within 1001-1500 mm/s, 751-1000 mm/s, 501-750 mm/s, 301-500 mm/s, or 1-300 mm/s, for example. For simplicity, further reference will not be made to a particular speed in test case 10. The calculated extended protective field for each sensor may be termed the extended protective field test length (or $EPFTL_{10, 108\ldots 109}$).

To run the auto safety verification test for test case 10, AGV 101 is navigated or placed into insert zone 405. AGV 101 may adjust its position such that AGV 101 is within a predetermined distance range to forward test object 401. Once AGV 101 is in insert zone 405, processing module 202 records the AGV's starting location using navigation sensor 104. Hence, before test case 10 begins, AGV 101 knows the AGV's starting position and the location of forward test object 401. In exemplary test case 10, the AGV may drive forward towards forward test object 401. As AGV 101 travels toward forward test object 401, the extended protective fields on TiMs sensors 108, 109 will eventually be triggered because these sensors will detect an object (in this case, forward test object 401) in their extended protective fields. Processing module 202 records the location of AGV 101 as each of the sensor's extended protective fields are triggered.

Assume that AGV 101 had coordinates of (0, 0) at its starting position, and coordinates (0, $Y_{10EP, 108}$), (0, $Y_{10P, 109}$) when the extended protective fields of TiMs sensors 108, 109 were triggered, respectively. Further assuming that the forward test object 401 has coordinates (0, $Y_{For}$), then the distance from AGV 101 to forward test object 401 when the extended protective fields were triggered would be represented as $|Y_{10EP, 108}-Y_{For}|=EPFTL_{10, 108}$; $|Y_{10P, 109}-Y_{For}|=EPFTL_{10, 109}$. Processing module 202 may then compare $EPFTL_{10, 108}$ and $EPFTL_{10, 109}$ to the extended protective field size recorded in memory module 206 (for the relevant speed). As explained above, in this example the sensor configuration for TiMs sensors 108, 109 may be the same, and may specify an extended protective field length (or $EPFL_{10}$) of three feet, for example, in front of AGV 101 (at a particular speed, such as when AGV 101 is moving at 1 to 300 mm/s). Sensor configurations for these two sensors may also specify a tolerance value (e.g., 4"). In the present example, the calculated $EPFTL_{10, 108}$ and $EPFTL_{10, 109}$ may be 1' 1" and 1' 2", respectively, which fall in the exemplary tolerance range of 3' 4" to 2' 8". Accordingly, TiMs sensors 108, 109 may be said to have passed the protective field test for test case 10. If the protective field test length did not fall in the allowable tolerance range, then TiMs sensors 108 and/or 109 may be said to have failed the protective field test for test case 10. Therefore, the test case may be re-run, sensor alignment may be checked, sensor calibration may be checked, and/or sensor configurations may be checked. Optionally, onboard controller 111 may output to a display (either on or off AGV 101) the relevant sensor configurations that have been loaded for the tested sensor(s). In this manner, one may readily determine whether the sensor configurations have been loaded correctly.

Figure 5:
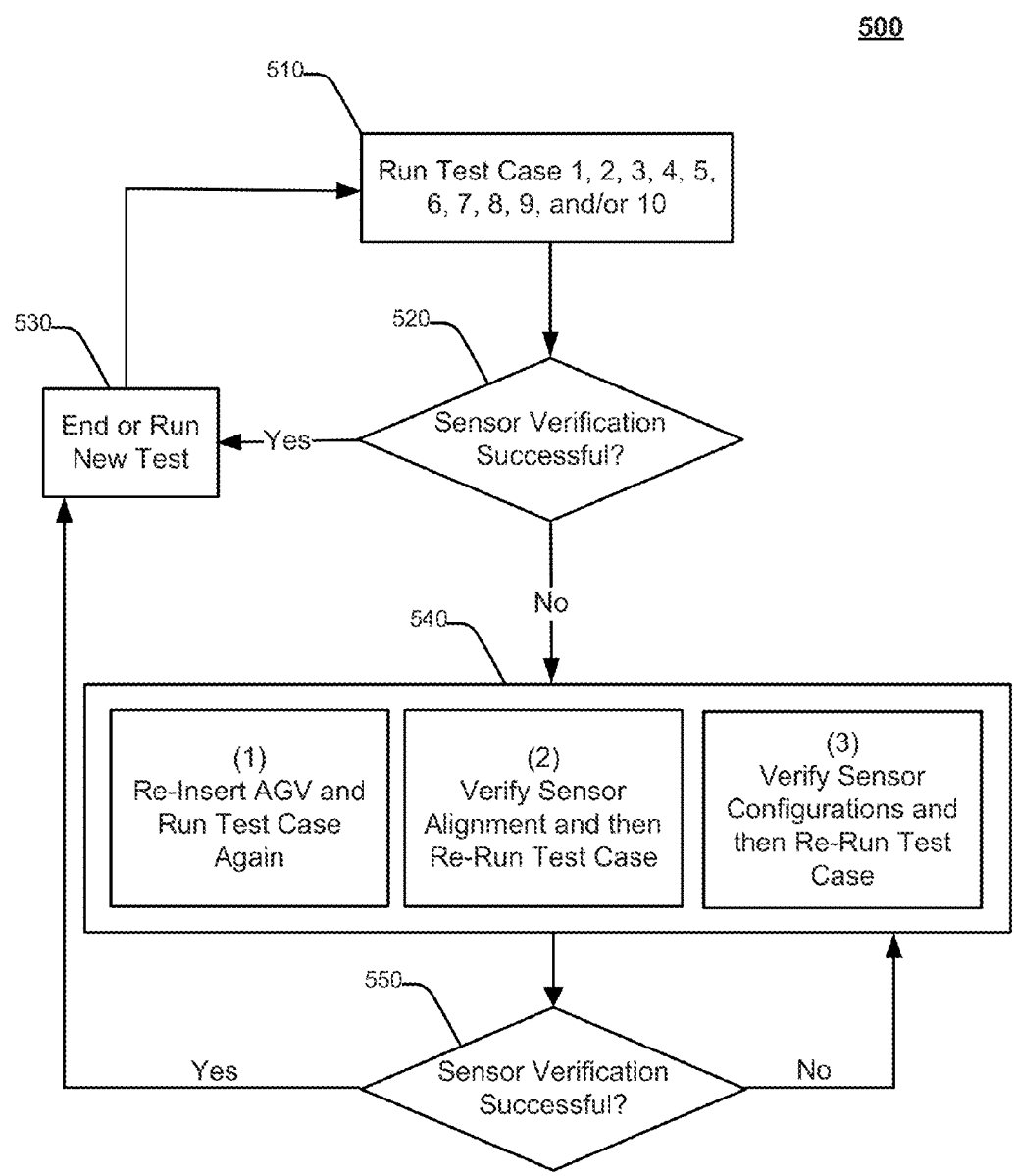
FIG. 5 is an illustrative flowchart of sensor verification in the auto safety verification of AGV sensors, according to an exemplary embodiment of the invention.

Referring to FIG. 5, an illustrative flowchart of a method for auto safety verification of AGV sensors is shown. Exemplary method 500 is provided by way of example, as there are a variety of ways to carry out methods according to the present disclosure. Method 500 shown in FIG. 5 can be executed or otherwise performed by one or a combination of various systems and modules. Method 500 described below may be carried out by system 100 shown in FIG. 1 and the modules shown in FIG. 2, by way of example, and various elements of system 100 and the modules of FIG. 2 are referenced in explaining the exemplary method of FIG. 5. Each block shown in FIG. 5 represents one or more processes, decisions, methods or subroutines carried out in exemplary method 500, and these processes, decisions, methods or subroutines are not necessarily carried out in the specific order outlined in FIG. 5, nor is each of them required. Referring to FIG. 5, method 500 may begin at 510.

At 510, test case 1, 2, 3, 4, 5, 6, 7, 8, 9, and/or 10 may be run. The purpose of the various test cases may be to verify that the warning field(s) and/or protective field(s) of one or more sensors on the AGV are correct and working properly. These exemplary tests cases may be carried out as explained above.

At 520, processing module 202 may determine whether the sensor verification was successful. This may be accomplished by comparing the calculated or measured warning and/or protective field size to a predetermined value stored in a sensor configuration file (e.g., $WFL_1$ or $PFL_{10}$ referred to above, for example). If the calculated/measured field size matches, or falls within a tolerance relative to, the predetermined field size stored in the relevant sensor configuration file (or a relevant portion thereof), then sensor verification may be said to be successful. If not, then sensor verification may be said to be unsuccessful.

If the sensor verification is successful then the process may continue to 530. At 530, the process may end or an additional test case may be run. Accordingly, the method may continue back to 510 where test case 1, 2, 3, 4, 5, 6, 7, 8, 9, and/or 10 may be run. If the sensor verification is unsuccessful, then the method may continue to 540.

At 540, various steps may be pursued. For example, (1) the AGV may be re-inserted into insertion zone 405 and one or more test cases may be run again. Or, (2) an operator may verify sensor alignment for one or more sensors, such as the sensor(s) that was(were) just tested, and then one or more test cases may be run again. Alternatively or additionally, (3) sensor configurations may be verified, such as for the sensor(s) that was(were) just tested, and then one or more test cases may be run again. (1), (2), and/or (3) may be carried out at 540.

At 550, processing module 202 may determine whether the sensor verification was successful. Again, this may be accomplished by comparing the calculated/measured warning and/or protective field size(s) to predetermined value(s).

If the sensor verification is determined to be successful at 550, then the method may continue to 530. At 530, the method may end or an additional test case may be run. Accordingly, the method may continue back to 510 where test case 1, 2, 3, 4, 5, 6, 7, 8, 9, and/or 10 may be run. If the sensor verification is unsuccessful, then the method may revert back to 540.

The method steps outlined above may be carried out until test cases 1, 2, 3, 4, 5, 6, 7, 8, 9, and/or 10 yield a successful sensor verification result. Only one test case may be required to satisfy particular safety standards. However, operators may desire to go above and beyond the minimum safety standard requirements to assure that multiple fields on multiple sensors on the AGV are configured correctly and working properly.

Figures 6A, 6B:
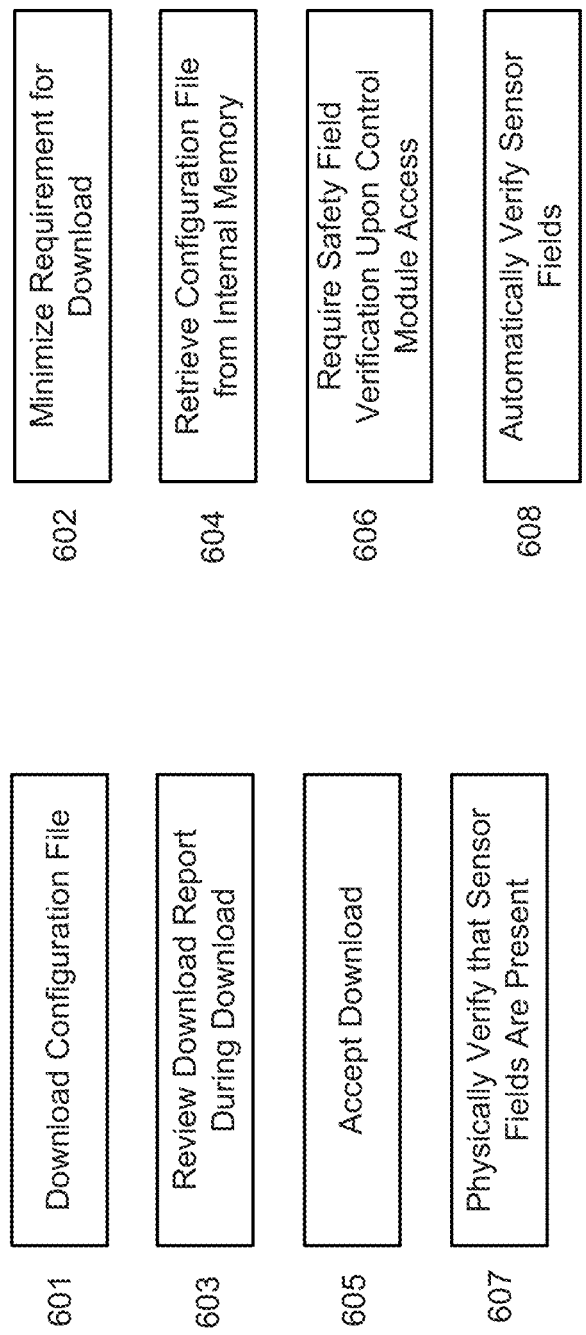
FIGS. 6A-6B represent an illustrative comparison of various features of a manual verification process and an auto verification process, according to an exemplary embodiment of the invention.

Referring to FIGS. 6A-6B, a manual safety field verification process is compared with an exemplary auto safety field verification process. As shown in FIG. 6A, in a manual process, sensor configuration files are downloaded from an external computer at 601. At 603, as the files are downloaded, the AGV or an external computer may produce a report showing what was downloaded to the AGV. At 605, a user may review the report and then accept the download. Thereafter at 607, a user physically verifies that sensor fields are present for the different sensors. As explained above, this manual process requires a user to move an object toward a stationary AGV until the sensor that is being tested senses the object's presence in either a warning or protective field. Then, the user measures the distance from the location at which the object was detected relative to the AGV, and then compares this measured distance with the warning or protective field length. This manual process is prone to errors, oversight, skipping, mistakes, or negligence. For example, a user may be confident that they downloaded the correct configuration file for a given sensor or sensors, and therefore may skip the physical verification test altogether, a user may measure or calculate something incorrectly, or may read a configuration incorrectly, for example.

On the other hand, in exemplary embodiments of the invention, several human errors can be avoided. For example, as indicated at 602, an exemplary embodiment may minimize the need to download configuration files from an external computer. This may be accomplished by initially downloading the correct configuration files to the AGV's internal memory, such as memory module 206 (FIG. 2). This will reduce the need to access configuration files external to the AGV and will also reduce the risk of tampering with configuration files prior to downloading them to the AGV. As indicated by 604, configuration files may easily be retrieved from internal memory, such as memory module 206.

Various other safety precautions may also be enabled. For example, as indicated at 606, control module 111 may require that the AGV undergo an auto safety verification test upon a user accessing memory module 206 and/or sensor module 204, or after certain events involving the AGV 101, such as replacement of a sensor, installing a new program on the AGV, replacing an internal sensor on the AGV, or replacing system memory (such as memory module 206) on the AGV, for example. By way of example, if a user downloads a new configuration file to control module 111, such configuration file will be stored in memory module 206. Control module 111 may require that the AGV 101 undergo an auto safety verification test upon such download to ensure, for example, that the configuration files are correct. If a user adjusts sensor sensitivity or sensor range by accessing sensor module 204, for example, then control module 111 may require that the AGV 101 undergo an auto safety verification test upon such to ensure, for example, that the new sensor sensitivity/range does not impair sensor operation for safety purposes. Control module 111 may prevent AGV 101 from operating in (or switching to) "auto" mode, and restrict operation to "manual" mode upon such system access. In such a case, a user may only be able to switch to "auto" mode, i.e., self-driving mode, by having the AGV 101 undergo an auto safety verification test. At 608, such auto safety verification test may be run and may include any one or more of test cases 1-10, as explained above with reference to FIG. 4. Upon a successful auto safety verification test (for one or more of test cases 1-10), AGV 101 may be permitted to operate in "auto" mode. Accordingly, by using the auto safety verification system, various human errors can be avoided and sensor configurations can be verified more quickly.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method for verifying one or more fields of one or more sensors on an automatic guided vehicle (AGV), the method comprising:
   driving, by a control module, from a starting location towards a first test object at a first speed;
   detecting, by a sensor module communicatively coupled to the one or more sensors, the first test object in the one or more fields;
   recording, by a processor module, a detection location indicative of a location of the AGV at which the sensor module detected the first test object;
   calculating a distance from the AGV to the first test object by comparing the detection location to a location of the first test object;
   comparing the calculated distance to a configuration distance stored in a memory module; and
   outputting, by the processor module, a data message indicating whether the one or more fields of the one or more sensors on the AGV have been verified,
   wherein the one or more fields comprise a warning field and a protective field, and wherein, responsive to an object being detected in the warning field by the sensor module, the control module causes the AGV to slow down and, responsive to an object being detected in the protective field by the sensor module, the control module causes the AGV to come to a stop.

2. The method according to claim 1, further comprising:
placing the AGV in a test insert zone; and
driving, by the control module, the AGV to the starting location before verifying the one or more fields of the one or more sensors.

3. The method according to claim 1, further comprising downloading a configuration file to the memory module on the AGV, the configuration file specifying the configuration distance for the one or more fields of the one or more sensors on the AGV.

4. The method according to claim 3, further comprising preventing, by the control module, the AGV from operating in an automatic mode outside of the verifying the one or more fields of the one or more sensors, upon (i) downloading the configuration file, (ii) replacing the one or more sensors, (iii) replacing the memory module, or (iv) physically accessing the control module or the memory module, until the one or more fields of the one or more sensors on the AGV have been verified.

5. The method of claim 1, wherein the one or more sensors comprises a front bumper sensor on the AGV, the first test object is a forward test object in front of the AGV, and the first speed is a maximum speed of the AGV.

6. The method of claim 1, wherein the one or more sensors comprises a front bumper sensor on the AGV, the first test object is a forward test object in front of the AGV, and the first speed is a speed less than a maximum speed of the AGV.

7. The method of claim 1, wherein the one or more sensors comprises at least one side sensor on the AGV, and the first test object is a rear test object behind the AGV.

8. The method of claim 1, wherein the one or more sensors comprises at least one side sensor on the AGV, and the first test object is a right or left test object in front of the AGV and to the right or left of the AGV, respectively.

9. The method of claim 1, further comprising outputting a report to a computer external to the AGV, the report comprising an identification of the AGV (AGVId) and the location of the AGV at which the sensor module detected the first test object in the one or more fields.

10. A system for verifying one or more fields of one or more sensors on an automatic guided vehicle (AGV), the system comprising at least one processor and:
a control module configured to drive the AGV from a starting location towards a first test object at a first speed;
a sensor module communicatively coupled to the one or more sensors and configured to detect the first test object in the one or more fields;
a processor module configured to:
record a detection location indicative of a location of the AGV at which the sensor module detected the first test object;
calculate a distance from the AGV to the first test object by comparing the detection location to a location of the first test object;
compare the calculated distance to a configuration distance stored in a memory module, and
output a data message indicating whether the one or more fields of the one or more sensors on the AGV have been verified wherein the one or more fields comprise a warning field and a protective field, and the control module is further configured to:
slow the AGV down upon the sensor module detecting an object in the warning field, and
stop the AGV upon the sensor module detecting an object in the protective field.

11. The system according to claim 10, wherein the control module is further configured to drive the AGV to the starting location before verifying the one or more fields of the one or more sensors.

12. The system according to claim 10, wherein the processor module is further configured to download a configuration file to the memory module on the AGV, the configuration file specifying the configuration distance for the one or more fields of the one or more sensors on the AGV.

13. The system according to claim 12, wherein the control module is further configured to prevent the AGV from operating in an automatic mode outside of the verifying the one or more fields of the one or more sensors, upon (i) downloading the configuration file, (ii) replacing the one or more sensors, (iii) replacing the memory module, or (iv) physically accessing the control module or the memory module, until the one or more fields of the one or more sensors on the AGV have been verified.

14. The system of claim 10, wherein the one or more sensors comprises a front bumper sensor on the AGV, the first test object is a forward test object in front of the AGV, and the first speed is a maximum speed of the AGV.

15. The system of claim 10, wherein the one or more sensors comprises a front bumper sensor on the AGV, the first test object is a forward test object in front of the AGV, and the first speed is a speed less than a maximum speed of the AGV.

16. The system of claim 10, wherein the one or more sensors comprises at least one side sensor on the AGV, and the first test object is a rear test object behind the AGV.

17. The system of claim 10, wherein the one or more sensors comprises at least one side sensor on the AGV, and the first test object is a right or left test object in front of the AGV and to the right or left of the AGV, respectively.

18. A non-transitory computer readable medium comprising code to perform the acts of the method of claim 1.

19. A method for verifying one or more fields of one or more sensors on an automatic guided vehicle (AGV), the method comprising:
driving, by a control module, from a starting location towards a first test object at a first speed;
detecting, by a sensor module communicatively coupled to the one or more sensors, the first test object in the one or more fields;
recording, by a processor module, a detection location indicative of a location of the AGV at which the sensor module detected the first test object;
calculating a distance from the AGV to the first test object by comparing the detection location to a location of the first test object;
downloading a configuration file to the memory module on the AGV, the configuration file specifying a configuration distance for the one or more fields of the one or more sensors on the AGV;
comparing the calculated distance to a configuration distance stored in a memory module;
outputting, by the processor module, a data message indicating whether the one or more fields of the one or more sensors on the AGV have been verified preventing, by the control module, the AGV from operating in an automatic mode outside of the actions of verifying the one or more fields of the one or more sensors, upon (i) downloading the configuration file, (ii) replacing the one or more sensors, (iii) replacing the memory module, or (iv) physically accessing the control module or the memory module, until the one or more fields of the one or more sensors on the AGV have been verified.

20. A system for verifying one or more fields of one or more sensors on an automatic guided vehicle (AGV), the system comprising at least one processor and:
   a control module configured to drive the AGV from a starting location towards a first test object at a first speed;
   a sensor module communicatively coupled to the one or more sensors and configured to detect the first test object in the one or more fields;
   a processor module configured to:
      record a detection location indicative of a location of the AGV at which the sensor module detected the first test object;
      calculate a distance from the AGV to the first test object by comparing the detection location to a location of the first test object;
      compare the calculated distance to a configuration distance stored in a memory module,
      output a data message indicating whether the one or more fields of the one or more sensors on the AGV have been verified,
      download a configuration file to the memory module on the AGV, the configuration file specifying the configuration distance for the one or more fields of the one or more sensors on the AG, and
      prevent the AGV from operating in an automatic mode outside of the actions of verifying the one or more fields of the one or more sensors, upon (i) downloading the configuration file, (ii) replacing the one or more sensors, (iii) replacing the memory module, or (iv) physically accessing the control module or the memory module, until the one or more fields of the one or more sensors on the AGV have been verified.

* * * * *